(12) United States Patent
Hosokawa et al.

(10) Patent No.: US 10,190,044 B2
(45) Date of Patent: Jan. 29, 2019

(54) METHOD FOR PRODUCING β-SIALON FLUORESCENT MATERIAL

(71) Applicant: NICHIA CORPORATION, Anan-shi, Tokushima (JP)

(72) Inventors: Shoji Hosokawa, Tokushima (JP); Motoharu Morikawa, Anan (JP); Tadayoshi Yanagihara, Anan (JP); Kenichi Aoyagi, Tokushima (JP); Takashi Kaide, Anan (JP)

(73) Assignee: NICHIA CORPORATION, Anan-shi (JP)

( * ) Notice: Subject to any disclaimer, the term of this patent is extended or adjusted under 35 U.S.C. 154(b) by 223 days.

(21) Appl. No.: 15/228,109

(22) Filed: Aug. 4, 2016

(65) Prior Publication Data

US 2017/0037311 A1 Feb. 9, 2017

(30) Foreign Application Priority Data

Aug. 7, 2015 (JP) .................. 2015-156890
Jun. 10, 2016 (JP) .................. 2016-115961

(51) Int. Cl.
*C09K 11/08* (2006.01)
*C09K 11/77* (2006.01)

(52) U.S. Cl.
CPC ...... *C09K 11/7734* (2013.01); *C09K 11/0883* (2013.01)

(58) Field of Classification Search
CPC .................. C09K 11/0883; C09K 11/7734
See application file for complete search history.

(56) References Cited

U.S. PATENT DOCUMENTS

| | | |
|---|---|---|
| 2007/0108896 A1 | 5/2007 | Hirosaki |
| 2010/0219741 A1 | 9/2010 | Kawasaki et al. |
| 2012/0305844 A1 | 12/2012 | Emoto et al. |

FOREIGN PATENT DOCUMENTS

| | | |
|---|---|---|
| JP | 2005-255895 A | 9/2005 |
| JP | 2007-326981 A | 12/2007 |
| JP | 2010-241995 A | 10/2010 |
| JP | 2011-174015 A | 9/2011 |
| JP | 2012-001716 A | 1/2012 |
| JP | 2013-173868 A | 9/2013 |
| JP | 2015-224339 A | 12/2015 |
| WO | 2012-033013 A1 | 3/2012 |
| WO | 2014-030637 A1 | 2/2014 |

*Primary Examiner* — C Melissa Koslow
(74) *Attorney, Agent, or Firm* — Hunton Andrews Kurth LLP (57) ABSTRACT

A method for producing a β-sialon fluorescent material can be provided. The method includes preparing a composition containing silicon nitride that contains aluminium, an oxygen atom, and europium, heat-treating the composition in a rare gas atmosphere or in a vacuum, and contacting the heat-treated composition with a gas containing elemental fluorine.

9 Claims, 4 Drawing Sheets

METHOD FOR PRODUCING β-SIALON FLUORESCENT MATERIAL

CROSS-REFERENCE TO RELATED APPLICATION

This application claims priority to Japanese Patent Application No. 2015-156890, filed Aug. 7, 2015 and Japanese Patent Application No. 2016-115961, filed Jun. 10, 2016, the entire disclosures of which are incorporated herein by reference.

BACKGROUND OF THE INVENTION

Field of the Invention

The present disclosure relates to a method for producing a β-sialon fluorescent material.

Description of the Related Art

Light emitting devices including, in combination, a light source, and a wavelength conversion member, which is capable of emitting light with hues different from the hue of the light source when excited by the light from the light source, and thus being capable of emitting light of various hues owing to the principle of the mixture of colors of light, has been developed. In particular, light emitting devices composed of a light emitting diode ("LED") combined with a fluorescent material are increasingly and widely utilized, for example, as backlights for liquid crystal displays or as lighting systems. When a light emitting device incorporates more than one fluorescent material, a fluorescent material that emits light at short wavelengths, such as blue-green, green, and yellow-green, and a fluorescent material that emits light at long wavelengths, such as orange and red, may be combined, for example, to allow liquid crystal displays to have an improved color reproduction range and lighting systems to have an improved color rendering.

As examples of such fluorescent materials, aluminate fluorescent materials, silicate fluorescent materials, sulfide fluorescent materials, phosphate fluorescent materials, and borate fluorescent materials are known. As a replacement of these fluorescent materials, fluorescent materials that have a nitrogen-containing inorganic crystal as a host crystal in the crystalline structure, such as sialon fluorescent materials, oxynitride fluorescent materials, and nitride fluorescent materials, have been proposed. Such fluorescent materials exhibit small luminance decrease associated with temperature increase and have superior durability. A representative example of such fluorescent materials is sialon, which is a solid solution of silicon nitride. α-type sialon fluorescent materials and β-type sialon fluorescent materials, which have different crystalline structure from each other, are attracting attention. In particular, β-type sialon fluorescent materials (hereinafter also referred to as "β-sialon fluorescent materials") are highly efficient, green fluorescent materials that are excited in a wide wavelength range of from near-ultraviolet light to blue light, and have a peak light emission wavelength in the range of from 520 nm to 550 nm.

β-sialon fluorescent materials, for instance, are represented by the formula: $Si_{6-z}Al_zO_zN_{8-z}$:Eu (0<z≤4.2). A β-sialon fluorescent material may be obtained as a sintered product by mixing silicon nitride ($Si_3N_4$), aluminium nitride (AlN), aluminium oxide ($Al_2O_3$), and europium oxide ($Eu_2O_3$), which serves as an activator, in a predetermined molar ratio, and sintering the mixture at around 2000° C. It has been disclosed that heat-treating the sintered product in an inert gas, and acid-treating the resultant product will produce a β-sialon fluorescent material with high luminance (see, for example, JP 2005-255895 A and JP 2011-174015 A). Furthermore, to enhance the luminance of a β-sialon fluorescent material, a method of performing heat treatment of a raw material powder separately twice at a high temperature, and also a method of using a β-sialon fluorescent material obtained by sintering as a part of raw materials, are known (see, for example, JP 2007-326981 A and JP 2013-173868 A).

SUMMARY OF INVENTION

A method for producing a β-sialon fluorescent material superior in light emitting luminance can be provided. The method includes preparing a composition containing silicon nitride that contains aluminium, an oxygen atom, and europium, heat-treating the composition in a rare gas atmosphere or in a vacuum, and contacting the heat-treated composition with a gas containing elemental fluorine.

DETAILED DESCRIPTION OF THE EMBODIMENT

There has been a demand for still further improvement in luminance of β-sialon fluorescent materials in a practical aspect. Hence, an embodiment of the present disclosure aims to provide a method for producing a β-sialon fluorescent material superior in light emitting luminance.

In view of the problem, the inventors found, as a result of intensive study, that heat-treating a β-sialon fluorescent material in a rare gas atmosphere or in a vacuum, and further contacting the β-sialon fluorescent material with a gas containing elemental fluorine, will result in a β-sialon fluorescent material further superior in light emitting luminance, and accomplished the present invention. That is, the present invention includes the following embodiment.

A method for producing a β-sialon fluorescent material includes providing a composition containing silicon nitride that contains aluminium, an oxygen atom, and europium, heat-treating the composition in a rare gas atmosphere or in a vacuum, and contacting the heat-treated composition with a gas containing elemental fluorine.

According to an embodiment of the present disclosure, a method for producing a β-sialon fluorescent material superior in light emitting luminance can be provided.

The modes for working the present invention will be described below with reference to embodiments. The modes shown below, however, are mere examples of the production method, for instance, for embodying the technical concept of the present invention, and the present invention is not limited to the following embodiments.

The relationship between the color names and the chromaticity coordinates, the relationship between the wavelength ranges of light and the color names of monochromatic light, and others are in accordance with Japanese Industrial Standard (JIS) Z8110.

As used herein, the term "step" means not only an independent step but also a step which cannot be clearly distinguished from the other steps but can achieve the anticipated effect of that step. Further, for the amount of each component contained in a composition, when a plurality of substances corresponding to the component exist, the amount of the component means the total amount of the substances present in the composition unless otherwise specified.

The mean particle diameter is a volume median diameter (Dm), which is measured by a pore electrical resistance method (Electrical sensing zone method) based on the Coulter principle. Specifically, a particle size distribution is measured using a particle size distribution measuring device (e.g., Multisizer manufactured by Beckman Coulter), and a volume median diameter (Dm) is obtained as a particle diameter corresponding to a cumulative volume of 50% from a minor diameter side of the particle.

Method for Producing a β-Sialon Fluorescent Material

The method for producing a β-sialon fluorescent material of the present embodiment includes providing a composition containing silicon nitride that contains aluminium, oxygen atom, and europium (hereinafter also referred to as "preparation step"), heat-treating the composition in a rare gas atmosphere or in a vacuum (hereinafter also referred to as "first heat treatment step"), and contacting the heat-treated composition with a gas containing elemental fluorine (hereinafter also referred to as "fluorine-treatment step").

The composition provided in the preparation step itself is, for instance, a β-sialon fluorescent material particle, and it is believed that heat-treating the composition in a rare gas atmosphere or in a vacuum causes thermal decomposition of an unstable phase such as a low crystalline portion or a non-crystalline portion contained in the fluorescent material particle, generating, for example, silicon. Subsequently contacting fluorescent material particles containing the thermolysis product with a gas containing elemental fluorine causes, for instance, at least a portion of the thermolysis product to gasify and get removed, for instance, in the form of fluorinated silicon. This results in higher luminance.

(Preparation Step)

In the preparation step, a composition containing silicon nitride that contains aluminium, an oxygen atom, and europium is provided. The composition to be prepared is, for instance, silicon nitride in which aluminium, an oxygen atom, and europium are solid-soluted, and is, for instance, represented by formula (I):

$$Si_{6-z}Al_zO_zN_{8-z}:Eu \quad (I)$$

In the formula, z satisfies $0<z\leq 4.2$.

The composition may be provided by, for instance, selecting a desired composition from commercial products, or by heat-treating a raw material mixture according to a usual manner to produce a desired composition.

In producing a composition in a preparation step, for instance, a desired composition can be obtained by heat-treating a mixture containing an aluminium compound, a europium compound, and a silicon nitride (hereinafter also referred to as "raw material mixture").

The raw material mixture may contain at least one aluminium compound, at least one europium compound, and at least one silicon nitride.

Examples of the aluminium compound include aluminium-containing oxides, hydroxides, nitrides, oxynitrides, fluorides, and chlorides. In place of at least a portion of the aluminium compound, a simple aluminium metal or an aluminium alloy may be used. Specific examples of the aluminium compound include aluminium nitride (AlN), aluminium oxide ($Al_2O_3$), and aluminium hydroxide (Al$(OH)_3$). At least one selected from the group consisting of these specific aluminium compounds may be used. These aluminium compounds may be used alone or in combination.

The average particle diameter of the aluminium compound to be used as a raw material may be, for instance, from 0.01 μm to 20 μm, or from 0.1 μm to 10 μm.

The purity of the aluminium compound may be, for instance, 95% by weight or more, or 99% by weight or more.

Examples of the europium compound include europium-containing oxides, hydroxides, nitrides, oxynitrides, fluorides, and chlorides. In place of at least a portion of the europium compound, a simple europium metal or a europium alloy may be used. Specific examples of the europium compound include europium oxide ($Eu_2O_3$), europium nitride (EuN), and fluorinated europium ($EuF_3$). At least one selected from the group consisting of these specific europium compounds may be used. These europium compounds may be used alone or in combination.

The average particle diameter of the europium compound to be used as a raw material may be, for instance, from 0.01 μm to 20 μm, or from 0.1 μm to 10.0 μm.

The purity of a first europium compound may be, for instance, 95% by weight or more, or 99.5% by weight or more.

The silicon nitride is a silicon compound containing a nitrogen atom and a silicon atom, and may be silicon nitride containing an oxygen atom. When the silicon nitride contains an oxygen atom, the oxygen atom may be contained in the form of silicon oxide, or in the form of an oxynitride of silicon.

The content of the oxygen atom contained in the silicon nitride may be, for instance, less than 2% by weight, or 1.5% by weight or less. The content of the oxygen atom may be also, for instance, 0.3% by weight or more, or 0.4% by weight or more.

The purity of the silicon nitride may be, for instance, 95% by weight or more, or 99% by weight or more.

The average particle diameter of the silicon nitride may be, for instance, from 0.01 μm to 15 μm, and from 0.1 μm to 5.0 μm.

The raw material mixture may be a mixture obtained by replacing at least a portion of silicon nitride with another silicon compound, such as simple silicon or silicon oxide. That is, the raw material mixture may contain, in addition to silicon nitride, a silicon compound, such as simple silicon or silicon oxide, or may contain a silicon compound, such as simple silicon or silicon oxide, in place of silicon nitride. Examples of silicon compounds include silicon oxide, silicon oxynitride, and silicate.

The mixing ratio of the aluminium compound, the europium compound, and the silicon nitride in the raw material mixture may be appropriately selected depending on the desired composition. For instance, the molar ratio of silicon atom to aluminium atom contained in the raw material mixture is (6-z):z (0<z≤4.2), or 0.01<z<1.0. The molar ratio of the combined molar quantity of silicon atom and aluminium atom to (the molar quantity of) europium atom may be, for instance, 6:0.001 to 6:0.05, or 6:0.003 to 6:0.02.

The raw material mixture may further contain a separately prepared β-sialon fluorescent material as necessary. When the raw material mixture contains a β-sialon fluorescent material, the content can be, for instance, from 1% by weight to 50% by weight in the total amount of the raw material mixture.

The raw material mixture may contain a flux, such as halide, as necessary. By a flux being contained in the raw material mixture, the reaction among the raw materials in the raw material mixture is further promoted, and a more uniform solid-phase reaction is facilitated, resulting in a fluorescent material having a large particle diameter and superior light emission properties. This is believed to be attributable, for instance, to the fact that the temperature of the heat treatment in the preparation step is equal to or greater than the temperature of the formation of the liquid phase, such as halide, which is a flux. Examples of halides usable include rare-earth metals, alkaline-earth metals, and chlorides or fluorides of alkali metals. The flux may be added as a compound that helps the element ratio of the cations to achieve the target composition, or may be further added as an additive after various materials are added to make up the target composition.

When the raw material mixture contains a flux, the content of the flux in the raw material mixture may be, for instance, 20% by weight or less, or 10% by weight. The content of the flux may be also, for instance, 0.1% by weight or more.

The raw material mixture may be obtained by weighing desired material compounds in a desired compounding ratio, and then mixing the material compounds by a mixing method using a ball mill, or a mixing method using a mixing machine, such as a Henschel mixer or a V-blender, or using a mortar and a pestle. The mixing may be dry mixing or wet mixing by adding, for instance, a solvent.

The temperature of the heat treatment in the raw material mixture may be, for instance, from 1850° C. to 2100° C., from 1900° C. to 2050° C., 1920° C. to 2050° C., or 2000° C. to 2050° C. Heat-treatment at a temperature of 1850° C. or more enables efficient formation of a β-sialon material, and easier incorporation of Eu into the crystal, resulting in a desired β-sialon fluorescent material. Heat treatment at a temperature of 2100° C. or less is likely to suppress degradation of the resulting β-sialon fluorescent material.

The atmosphere of the heat treatment of the raw material mixture may be a nitrogen gas-containing atmosphere, or may be essentially a nitrogen gas atmosphere. When the atmosphere of the heat treatment of the raw material mixture contains a nitrogen gas, the atmosphere may contain another gas, such as hydrogen, oxygen, or ammonia, in addition to the nitrogen gas. The content of the nitrogen gas in the atmosphere of the heat treatment of the raw material mixture may be, for instance, 90% by volume or more, or 95% by volume or more.

The pressure in the heat treatment of the raw material mixture may be, for instance, from normal pressure to 200 MPa. To suppress degradation of the β-sialon fluorescent material to be generated, the pressure may be high, for instance, from 0.1 MPa to 200 MPa, or from 0.6 MPa to 1.2 MPa, for less restriction on industrial equipment.

In the heat treatment of the raw material mixture, for instance, the heat treatment is performed, for instance, by elevating the temperature from room temperature to a predetermined temperature. The time for elevating the temperature may be, for instance, from 1 hour to 48 hours, from 2 hours to 24 hours, or from 3 hours to 20 hours. When the time for elevating the temperature is 1 hour or more, the fluorescent material particles are likely to fully grow, and Eu is likely to be easily incorporated into the crystal of the fluorescent material particles.

In the heat treatment of the raw material mixture, a retention time at a predetermined temperature may be provided. The retention time may be, for instance, from 1 hour to 48 hours, from 2 hours to 30 hours, or from 3 hours to 20 hours.

The time for lowering the temperature from a predetermined temperature to room temperature in the heat treatment of the raw material mixture may be, for instance, from 0.1 hour to 20 hours, from 1 hour to 15 hours, or from 3 hours to 12 hours. A retention time may be provided at a temperature appropriately selected while the temperature is lowered from a predetermined temperature to room temperature. This retention time is, for instance, adjusted to further enhance the light-emitting luminance of a β-sialon fluorescent material. The retention time at a predetermined temperature while the temperature is lowered may be, for instance, from 0.1 hour to 20 hours, or from 1 hour to 10 hours. The temperature during the retention time may be, for instance, from 1000° C. to less than 1800° C., or from 1200° C. to 1700° C.

The raw material mixture may be heat-treated, for instance, in a boron nitride crucible.

After the heat treatment of the raw material mixture, a sizing step including operations in combination of crushing, grinding, and classifying a composition resulting from the heat treatment, may be performed. Particles of a desired particle diameter can be obtained by the sizing step. Specifically, after roughly grinding a composition, the roughly ground particles may be ground using a common grinder, such as a ball mill, a jet mill, and a vibration mill to have a predetermined particle diameter. Excessive grinding, however, may cause defects on the surface of the fluorescent material particles, resulting in luminance decrease. When particles having different particle diameters are present after grinding, the particle diameters may be made uniform by classifying the particles. The final adjustment of the particle diameter can also be made after a first heat treatment step or fluorine-treatment step described later.

(First Heat Treatment Step)

In the first heat treatment step, the composition provided in the preparation step is heat-treated in a rare gas atmosphere or in a vacuum to obtain a first heat-treated product. It is believed that in the first heat treatment step, for instance, at least a portion of an unstable phase such as a low crystalline portion or a non-crystalline portion present in a β-sialon fluorescent material can be decomposed.

The rare gas atmosphere in the first heat treatment step will suffice as long as it contains at least one rare gas, such as helium, neon, or argon, and the rare gas atmosphere may contain at least argon. The rare gas atmosphere may contain oxygen, hydrogen, and nitrogen, in addition to the rare gas. The content of the rare gas in the rare gas atmosphere is, for instance, 95% by volume or more, or 99% by volume or more.

The pressure in the first heat treatment step may be, for instance, in the range of from normal pressure to 1 MPa, or from normal pressure to 0.2 MPa.

The first heat treatment step may be performed at a pressure lower than normal pressure, or performed in a vacuum. Heat treatment in a vacuum is performed at a pressure of, for instance, 10 kPa or less, 1 kPa or less, or 100 Pa or less. Here, "under reduced pressure" or "in a vacuum" does not rule out the presence of a gas. Gases that may be present include a rare gas, nitrogen, hydrogen, and oxygen.

The temperature of the heat treatment in the first heat treatment step is, for instance, from 1300° C. to 1600° C., or from 1350° C. to 1500° C. The temperature of the first heat treatment step may be lower than the temperature for heat-treating the raw material mixture. This is believed to cause efficient thermal decomposition of, for instance, an unstable phase such as a low crystalline portion or a non-crystalline portion contained in the fluorescent material particles, resulting in more stable fluorescent material particles with high crystallinity. Furthermore, the thermolysis product generated in the first heat treatment step contains, for instance, simple silicon, and such a thermolysis product can be removed by the fluorine-treatment step described later.

The time for the heat treatment in the first heat treatment step may be, for instance, from 1 hour to 48 hours, or from 2 hours to 20 hours.

In the first heat treatment step, the heat treatment is performed, for instance, by elevating the temperature from room temperature to a predetermined temperature. The time for elevating the temperature may be, for instance, from 1 hour to 48 hours, 2 hours to 24 hours, or 3 hours to 20 hours.

In the first heat treatment step, a retention time at a predetermined temperature may be provided. The retention time may be, for instance, from 1 hour to 48 hours, from 2 hours to 30 hours, or from 3 hours to 20 hours.

The time for lowering the temperature from a predetermined temperature to room temperature in the first heat treatment step may be, for instance, from 0.1 hour to 20 hours, from 1 hour to 15 hours, or from 3 hours to 12 hours. A retention time may be provided at a temperature appropriately selected while the temperature is lowered from a predetermined temperature to room temperature. This retention time is adjusted, for instance, to enhance the light-emitting luminance of the β-sialon fluorescent material. The retention time at a predetermined temperature while the temperature is lowered may be, for instance, from 0.5 hour to 20 hours, or from 1 hour to 10 hours. The temperature during the retention time may be, for instance, from 800° C. to less than 1600° C., or from 1000° C. to 1400° C.

In the first heat treatment step, the composition prepared in the preparation step may be heat-treated in the presence of a europium compound. In that case, heat-treating is preferably performed in a rare gas atmosphere.

A β-sialon fluorescent material having superior light-emitting luminance can be efficiently produced by heat-treating a composition obtained in the preparation step in the presence of a europium compound in a rare gas atmosphere. This can be, for instance, analyzed as described below. By performing a first heat treatment step in the presence of a europium compound in a rare gas atmosphere, at least a portion of the europium compound is reduced, generating a gaseous product derived from the europium compound. Contacting the gaseous product with a composition prepared in the preparation step is believed to facilitate reduction of europium contained in the composition into a bivalent state. It is also believed that the europium compound-derived gaseous product in a reduced state is incorporated into the composition. A combination of these factors is believed to further improve light-emitting luminance.

Examples of the europium compound to be used in the first heat treatment step include europium-containing oxides, hydroxides, nitrides, oxynitrides, fluorides, and chlorides. In place of at least a portion of a europium compound, a simple europium metal or a europium alloy may be used. Specific examples of the europium compound include europium oxide ($Eu_2O_3$), europium nitride (EuN), and fluorinated europium ($EuF_3$), and at least one selected from the group consisting of these specific europium compounds is preferable, and europium oxide is more preferable. These europium compounds may be used alone or in combination.

The average particle diameter of the europium compound to be used in the first heat treatment step may be, for instance, from 0.01 μm to 20 μm, or from 0.1 μm to 10.0 μm.

The purity of the europium compound may be, for instance, 95% by weight or more, or 99.5% by weight or more.

When a europium compound is used in the first heat treatment step, the content of the europium compound relative to the composition obtained in the preparation step (100% by weight) may be, for instance, 0.01% by weight or more, 0.05% by weight or more, or 0.1% by weight or more. The content may also be 50% by weight or less, 20% by weight or less, 15% by weight or less, or 10% by weight or less.

When a europium compound is used in the first heat treatment step, heat treatment may be performed in such a manner that a gaseous product generated from the europium compound may come in contact with the composition obtained in the preparation step. For instance, the composition obtained in the preparation step and a europium compound may be mixed and put into a same container and then heat-treated, or the composition obtained in the preparation step and a europium compound may be put into a same container without being mixed together or into different containers and then heat-treated. Alternatively, a portion of a europium compound may be mixed with the composition obtained in the preparation step, and the resultant mixture and the remaining portion of the europium compound may be put into a same container without being mixed together or into different containers, and then heat-treated. When the composition obtained in the preparation step and a europium compound are mixed, it is preferred that they should be mixed as uniformly as possible.

After the first heat treatment step, a step of, for instance, crushing and grinding the resultant heat-treated product may be included. Crushing, grinding, or the like can be performed by any of the previously described methods.

(Fluorine-treatment Step)

In the fluorine-treatment step, a heat-treated composition (a first heat-treated product) obtained in the first heat treatment step is contacted with a gas containing elemental fluorine to obtain a fluorine-treated product. It is believed that a thermolysis product or the like contained in the heat-treated composition is removed by contacting the heat-treated composition with an elemental fluorine-containing gas, leading to improved light-emitting luminance.

Any material that contains elemental fluorine in its molecular structure and gasifies in the fluorine-treatment step may be used as an elemental fluorine-containing gas, and a material industrially widely used as, for example, an etching agent may be used. The elemental fluorine-containing gas preferably contains at least one selected from the group consisting of $F_2$, $BrF_3$, $BrF_5$, $NH_4HF_2$, $NH_4F$, $PF_3$, $PF_5$, $SiF_4$, $SF_6$, $S_2F_{10}$, $ClF_3$, $CF_4$, $CHF_3$, $KrF_2$, $XeF_2$, $XeF_4$, $BF_3$ and $NF_3$, and more preferably contains at least $F_2$. The elemental fluorine-containing gas may be a gas emitted from a compound containing elemental fluorine in the fluorine-treatment step. For instance, although $NH_4HF_2$, $NH_4F$ and the like are solid at 25° C., these compounds are believed to be able to emit an elemental fluorine-containing gas in the fluorine-treatment step.

The heat-treated composition may be contacted with an elemental fluorine-containing gas in the presence of an inert gas. By contacting in the presence of an inert gas, a thermolysis product or the like may be removed more efficiently. Examples of the inert gas include rare gases, such as helium, neon, and argon, and nitrogen, and the inert gas preferably contains at least one selected from these gases. The heat-treated composition may be contacted with an elemental fluorine-containing gas in the presence of other gases in addition to an inert gas. Examples of the other gases include oxygen, hydrogen, and chlorine.

The content of an elemental fluorine-containing gas in a contact atmosphere in which a heat-treated composition is contacted with an elemental fluorine-containing gas may be, for instance, 0.01% by volume or more, 0.1% by volume or more, or 1% by volume or more. The content of the elemental fluorine-containing gas in the contact atmosphere may also be, for instance, 100% by volume or less, or 50% by volume or less. When the contact atmosphere contains another gas, the content of the other gas is the remaining portion of the elemental fluorine-containing gas.

The content of moisture in the contact atmosphere where the heat-treated composition is contacted with an elemental fluorine-containing gas may be, in consideration of light-emitting luminance, for instance, 1% by weight or less, 100 ppm or less in weight, or, essentially contains no moisture. This is because, for instance, if an elemental fluorine-containing gas reacts with moisture, fluorinated hydrogen may be generated, and the presence of fluorinated hydrogen requires consideration of durability of the device with respect to the fluorinated hydrogen.

The pressure in the contact atmosphere to cause the heat-treated composition into contact with an elemental fluorine-containing gas may be, for instance, in the range of from 10 Pa to 1 MPa, or from 100 Pa to 0.2 MPa.

In the process of contacting the heat-treated composition with an elemental fluorine-containing gas, if the amount of the elemental fluorine-containing gas is not enough, the process fails to proceed sufficiently, and if the amount of the elemental fluorine-containing gas is excessive, there is a risk of the gas reacting even with the target β-sialon fluorescent material particles. Thus, if the fluorine-treatment step is performed batch-wise, the amount of the elemental fluorine-containing gas is as follows: elemental fluorine may be from 0.1 molar equivalent to 2000 molar equivalents, from 1 molar equivalent to 100 molar equivalents, or from 1.5 molar equivalents to 50 molar equivalents in $F_2$-gas equivalent terms relative to the thermolysis product generated in the first heat treatment step, in simple silicon-equivalent terms.

The contact temperature at which the heat-treated composition is contacted with an elemental fluorine-containing gas may be, in consideration of treatment efficiency, for instance, 0° C. or more, 25° C. or more, above 50° C., 70° C. or more, or 80° C. or more. The contact temperature may also be, for instance, less than the temperature for the heat treatment in the first heat treatment step, 600° C. or less, less than 500° C., or 400° C. or less.

When the contact temperature is lower than the temperature for the heat treatment of the first heat treatment step, the occurrence of defects in host crystal lattice attributable to the decomposition of the host crystal is more efficiently minimized. When the contact temperature is 0° C. or more, the composition contacts with the gas more uniformly, thereby efficiently removing the thermolysis product or the like.

The contacting time in the fluorine-treatment step may be appropriately selected depending on, for instance, the contact atmosphere and the contact temperature. The contacting time may be, for instance, from 10 minutes to 24 hours, or from 30 minutes to 10 hours.

After the fluorine-treatment step, a step of crushing, grinding, or the like of the resultant fluorine-treated product may be included. The crushing, grinding or the like may be performed in the previously described methods.

(Second Heat Treatment Step)

The method for producing a β-sialon fluorescent material may include heat-treating a composition prepared in the preparation step in a nitrogen atmosphere ("second heat treatment step") before performing the first heat treatment step. Performing a second heat treatment step will lead to a β-sialon fluorescent material with higher light-emitting luminance. This is believed to be attributable to, for instance, improved crystallinity and crystalline growth as a result that particles of insufficient crystalline growth contained in the composition in the preparation step are incorporated into larger particles to form even larger particles.

The temperature for the heat treatment in the second heat treatment step may be, for instance, 1800° C. to 2100° C., 1850° C. to 2040° C., or 1900° C. to less than 2040° C. The temperature for the heat treatment in the second heat treatment step may be equal to or lower than the temperature for the heat treatment in the heat treatment of the raw material mixture. When there is a difference in temperature, the difference in temperature may be 10° C. or more, or 20° C. or more. The upper limit of the difference in temperature may be 100° C. or less.

The atmosphere of the second heat treatment step is a nitrogen atmosphere containing a nitrogen gas, and is, preferably, essentially a nitrogen gas atmosphere. The nitrogen atmosphere of the second heat treatment step may contain another gas, such as hydrogen, oxygen, or ammonia, in addition to the nitrogen gas. The content of the nitrogen gas in the nitrogen atmosphere of the second heat treatment step may be, for instance, 90% by volume or more, or 95% by volume or more.

The pressure in the second heat treatment step can be, for instance, from normal pressure to 200 MPa. To suppress degradation of the β-sialon fluorescent material to be generated, the pressure may be high, specifically from 0.1 MPa to 200 MPa, or from 0.6 MPa to 1.2 MPa, for less restriction on industrial equipment.

In the second heat treatment step, the heat treatment is performed, for instance, by elevating the temperature from room temperature to a predetermined temperature. The time for elevating the temperature may be, for instance, from 1 hour to 48 hours, 2 hours to 24 hours, or 3 hours to 20 hours.

In the second heat treatment step, a retention time at a predetermined temperature may be provided. The retention time may be, for instance, from 1 hour to 48 hours, from 2 hours to 30 hours, or from 3 hours to 20 hours.

The time for lowering the temperature from a predetermined temperature to room temperature in the second heat treatment step may be, for instance, from 0.1 hour to 20 hours, from 1 hour to 15 hours, or from 3 hours to 12 hours. A retention time may be provided at a temperature appropriately selected from a predetermined temperature to room temperature while the temperature is being lowered from the predetermined temperature to room temperature. This retention time may be adjusted, for instance, to further improve emission luminance of the β-sialon fluorescent material to be produced. The retention time at a predetermined temperature while the temperature is lowered may be, for instance, from 0.1 hour to 20 hours, or from 1 hour to 10 hours. The temperature during the retention time may be, for instance, from 1000° C. to less than 1800° C., or from 1200° C. to 1700° C.

When the method for producing a β-sialon fluorescent material includes the second heat treatment step, a composition that underwent the second heat-treatment is used in the first heat treatment step. The second heat treatment step in the method for producing a β-sialon fluorescent material may be performed more than once. In that case, a composition that underwent the final second heat treatment is used for the first heat treatment step.

(Third Heat Treatment Step)

In the method for producing a β-sialon fluorescent material, heat-treating a fluorine-treated product resulting from a fluorine-treatment step (also referred to as "third heat treatment step") may be performed before a washing step that is described later. It is believed that by performing a third heat treatment step, crystallinity of the fluorine-treated product resulting from the fluorine-treatment step is improved, leading to a β-sialon fluorescent material superior in light-emitting luminance.

The temperature for the heat treatment in third heat treatment step may be, for instance, from 1000° C. to 1800° C., from 1100° C. to 1700° C., or 1150° C. to less than 1650° C.

The atmosphere of the third heat treatment step may be a nitrogen gas-containing atmosphere, or, essentially a nitrogen gas atmosphere. When the atmosphere in the third heat treatment step contains nitrogen, the atmosphere may contain another gas, such as hydrogen, oxygen, or ammonia, in addition to nitrogen. The content of nitrogen in the atmosphere of the third heat treatment step may be, for instance, 90% by volume or more, or 95% by volume or more.

The pressure in the third heat treatment step is, for instance, from normal pressure to 200 MPa. To suppress degradation of the β-sialon fluorescent material to be generated, the pressure may be high, specifically from 0.1 MPa to 200 MPa, or from 0.6 MPa to 1.2 MPa, for less restriction on industrial equipment.

In the third heat treatment step, the heat treatment is performed, for instance, by elevating the temperature from room temperature to a predetermined temperature. The time for elevating the temperature may be, for instance, from 1 hour to 48 hours, from 2 hours to 24 hours, or from 3 hours to 20 hours.

In the third heat treatment step, a retention time at a predetermined temperature may be provided. The retention time may be, for instance, from 1 hour to 48 hours, from 2 hours to 30 hours, or from 3 hours to 20 hours.

The time for lowering the temperature from a predetermined temperature to room temperature in the third heat treatment step may be, for instance, from 0.1 hour to 20 hours, from 1 hour to 15 hours, or from 3 hours to 12 hours. A retention time may be provided at a temperature appropriately selected while the temperature is lowered from a predetermined temperature to room temperature. This retention time is adjusted, for instance, to enhance the light-emitting luminance of the β-sialon fluorescent material.

(Washing Step)

The method for producing a β-sialon fluorescent material may include, as necessary, washing a fluorine-treated product resulting from the fluorine-treatment step with a liquid medium (hereinafter also referred to as "washing step"). When the method for producing a β-sialon fluorescent material includes the third heat treatment step, the washing step may include, not only washing of a fluorine-treated product resulting from the fluorine-treatment step, but also washing of a heat-treated product resulting from the third heat treatment step.

The method for producing a β-sialon fluorescent material according to the present embodiment is basically complete when the fluorine-treatment step is completed. The washing step does not significantly affect light-emitting properties of the β-sialon fluorescent material that underwent the fluorine-treatment step, and merely removes unnecessary components such as fluorinated aluminium and fluorinated europium, which are contained in a minute amount. Although a thermolysis product such as silicon generated in the first heat treatment step is removed in the fluorine-treatment step, besides silicon, Al and Eu that are contained in the fluorescent material composition are believed to react with fluorine to form a minute amount of a fluoride. Since such formed unnecessary components largely differ from a β-sialon fluorescent material in shape and size, they can also be removed by classification due to differences in particle size. For efficient removal, washing with an acidic solution, such as hydrochloric acid or nitric acid, or, an alkaline solution, such as aqueous sodium hydroxide or aqueous potassium hydroxide, may be performed to dissolve such components for classification treatment.

In the washing step, a fluorine-treated product is washed using a liquid medium. The liquid properties of the liquid medium are not limited, and examples of the liquid medium include water, alcohol, such as ethanol, an acidic solution, such as hydrochloric acid or nitric acid, and an alkaline solution, such as sodium hydroxide or potassium hydroxide, and using at least one selected from the group consisting of these liquid media is preferable.

The washing may be performed, for instance, by immersing a fluorine-treated product in a liquid medium with stirring if necessary, and then performing solid-liquid separation. The solid-liquid separation may be followed by drying as necessary.

The temperature of a liquid medium to be used for washing may be, for instance, from 5° C. to 95° C., or from 25° C. to 80° C. The time for washing may be, for instance, from 1 minute to 480 minutes, or from 5 minutes to 120 minutes.

The washing step preferably includes a washing method using an acidic solution or an alkaline solution as a liquid medium. By washing with an acidic solution or an alkaline solution, unnecessary components generated in the first heat treatment step can be more efficiently removed.

The washing step may be performed more than twice using a same or different liquid medium. For instance, after a first washing with an acidic solution or an alkaline solution, a second washing may be performed with water. This allows, for instance, efficient removal of an acidic compound or an alkaline compound adhered to the surface of a β-sialon fluorescent material in the first washing.

The β-sialon fluorescent material of the present embodiment is superior in light emitting luminance and stability as a result of being obtained by the specific production method. For instance, compared to the case where no fluorine-treatment is performed, the light-emitting luminance can be improved by 5% or more, 10% or more, and even 100% or more.

Although a β-sialon fluorescent material of the present embodiment has, for instance, a composition represented by previously shown formula (I), the β-sialon fluorescent material may contain a minute amount of fluorine. When a β-sialon fluorescent material contains fluorine, the content may be, for instance, from 50 ppm to 18000 ppm, or from 70 ppm to 1000 ppm. The fluorine may be derived from, for instance, raw materials in the raw material mixture, a flux, an elemental fluorine-containing gas, or fluorinated hydrogen.

The β-sialon fluorescent material according to the present embodiment absorbs light in the ultraviolet region to visible light at short wavelengths, and has a peak light emission wavelength at a longer wavelength compared to the peak light emission wavelength of the excitation light. The visible light at short wavelengths is mainly in the blue light region. Specifically, the β-sialon fluorescent material according to the present embodiment is excited by light from an excitation light source having a peak light emission wavelength in the wavelength range of from 250 nm to 480 nm, and emits fluorescence having a peak light emission wavelength in the wavelength range of from 520 nm to 560 nm. A fluorescent material having high light emission efficiency can be provided by using an excitation light source in this range. In particular, it is preferred that an excitation light source having a main peak light emission wavelength in the range of from 350 nm to 480 nm be used, and it is more preferred that an excitation light source having a peak light emission wavelength in the range of from 420 nm to 470 nm be used.

The β-sialon fluorescent material according to the present embodiment also has high crystallinity. For instance, since a glass body (amorphous) has an irregular structure and low crystallinity, unless the reaction conditions in the production steps are controlled to be strictly uniform, the ratio of components in the resultant fluorescent material varies, and this is likely to cause chromaticity unevenness, for example. In contrast, the β-sialon fluorescent material according to the present embodiment is a powder or a granule having a high crystalline structure in at least a portion thereof, and thus the β-sialon fluorescent material according to the present embodiment is likely to be easily produced and processed. In addition, since the β-sialon fluorescent material according to the present embodiment can be uniformly dispersed in an organic medium, light emitting plastics and polymeric thin film materials, for example, can be readily prepared using the β-sialon fluorescent material according to the present embodiment. Specifically, the β-sialon fluorescent material according to the present embodiment is a structure where, for example, 50% by weight or more, or 80% by weight or more has a crystallinity. This indicates the proportion of the crystalline phase having light emission properties, and is preferable because a crystalline phase of 50% by weight or more ensures emission of light enough for practical use. Thus, the light emitting efficiency increases with the increasing ratio of crystalline phase. This leads to higher luminance and easy processability.

The mean particle diameter of the β-sialon fluorescent material according to the present embodiment may be, for instance, from 4 μm to 40 μm, or from 8 μm to 30 μm in terms of volume median diameter (Dm) measured using the Coulter principle. The β-sialon fluorescent material may contain particles of this mean particle diameter at high frequency. That is, the particle sizes may be distributed in a narrow range. A light emitting device including a β-sialon fluorescent material having a particle size distribution with a narrow half bandwidth has less color unevenness, and thus has favorable color tone. Furthermore, the larger the mean particle diameter, the higher the light absorption and the light emission efficiency. As described above, by incorporating a fluorescent material having a large mean particle diameter that has optically superior characteristics into a light emitting device, the light emission efficiency of the light emitting device improves.

EXAMPLES

Example 1

Preparation Step

Silicon nitride ($Si_3N_4$), aluminium nitride (AlN), and europium oxide ($Eu_2O_3$), which constitute raw material compounds, were weighed so that the molar ratio satisfies Si:Al:Eu=5.88:0.12:0.01, and mixed. The raw material mixture was filled into a boron nitride crucible, and was subjected to heat-treating at 2030° C. for 10 hours at a pressure of about 0.92 MPa (gauge pressure) in a nitrogen atmosphere so as to obtain a β-sialon fluorescent material.

A β-sialon fluorescent material that underwent the heat treatment, silicon nitride, aluminium nitride, and europium oxide were mixed to obtain a raw material mixture. The ratio of Si:Al:Eu at this time was set to be the same as the previous ratio, and the content of the β-sialon fluorescent material was set to be 20% by weight relative to the total amount of the raw material mixture. The raw material powder was sintered at 1970° C. for 10 hours at a pressure of about 0.92 MPa (gauge pressure) in a nitrogen atmosphere, and heat-treatment was performed with a retention time of 5 hours at a temperature of 1500° C. while the temperature was lowered to room temperature to obtain a composition represented by formula (I).

Second Heat Treatment Step

The resultant composition was ground, and the ground product was filled into a boron nitride crucible, and subjected to a second heat treatment step under the conditions of: elevating the temperature to a temperature of 2030° C. for 10 hours at a pressure of about 0.92 MPa (gauge pressure) in a nitrogen atmosphere, subsequently lowering the temperature to room temperature with a retention time of 5 hours at a temperature of 1500° C., so as to obtain a heat-treated product resulting from the second heat treatment step.

First Heat Treatment Step

The heat-treated product that underwent the second heat treatment step and europium oxide in an amount of 0.5% in weight ratio relative to this heat-treated product were weighted and mixed to obtain a mixture. The obtained mixture was subjected to heat treatment under the conditions of: heat-treating at a temperature of 1400° C. for 5 hours in an argon atmosphere at normal pressure, and subsequently lowering the temperature to room temperature with a retention time of 5 hours at a temperature of 1100° C., so as to obtain a heat-treated product.

Fluorine-treatment Step

The obtained heat-treated product was subjected to a fluorine-treatment step at a temperature of 25° C. at a treatment time of 8 hours in a mixed gas atmosphere containing fluorine gas ($F_2$) and nitrogen gas ($N_2$), with a fluorine gas-concentration of 20% by volume, so as to obtain a fluorine-treated product as Fluorescent material 1.

Example 2

A synthesis was performed in the same conditions as those of Example 1 except that the temperature for the treatment in the fluorine-treatment step was changed to 50° C. to obtain Fluorescent material 2.

Example 3

A synthesis was performed in the same conditions as those of Example 1 except that the temperature for the treatment in the fluorine-treatment step was changed to 100° C. to obtain Fluorescent material 3.

Example 4

A synthesis was performed in the same conditions as those of Example 1 except that the temperature for the treatment in the fluorine-treatment step was changed to 150° C. to obtain Fluorescent material 4.

Example 5

A synthesis was performed in the same conditions as those of Example 1 except that the temperature for the treatment in the fluorine-treatment step was changed to 300° C. to obtain Fluorescent material 5.

Example 6

A synthesis was performed in the same conditions as those of Example 1 except that the temperature for the treatment in the fluorine-treatment step was changed to 500° C. to obtain Fluorescent material 6.

Example 7

The fluorescent material obtained in Example 4 (Fluorescent material 4) was stirred in pure water at 25° C. for 60 minutes, and then isolated and dried to obtain Fluorescent material 7.

Example 8

The fluorescent material obtained in Example 4 (Fluorescent material 4) was stirred in a sodium hydroxide solution (adjusted to a pH of approximately 12) at 25° C. for 60 minutes, and then isolated and dried to obtain Fluorescent material 8.

Example 9

The fluorescent material obtained in Example 4 (Fluorescent material 4) was stirred in hydrochloric acid (concentration: 19% by weight) at 25° C. for 60 minutes, and then isolated and dried to obtain Fluorescent material 9.

Example 10

The fluorescent material obtained in Example 6 (Fluorescent material 6) was stirred in pure water at 25° C. for 60 minutes, and then isolated and dried to obtain Fluorescent material 10.

Example 11

The same procedure as Example 9 was performed except that the time for treatment in the fluorine-treatment step was changed from 8 hours to 5 hours to obtain Fluorescent material 11.

Example 12

The same procedure as Example 9 was performed except that the time for treatment in the fluorine-treatment step was changed from 8 hours to 0.5 hour to obtain Fluorescent material 12.

Comparative Example 1

A synthesis was performed in the same conditions as those of Example 1 except that the fluorine-treatment step was not performed to obtain Fluorescent material C1.

<Evaluation>

The average particle diameter of the resultant β-sialon fluorescent material (Dm: median diameter) was measured using a particle-size distribution measuring device (Multisizer manufactured by Beckman Coulter) by the pore electrical resistance method (Electrical sensing zone method) based on the Coulter principle.

The light-emitting properties of the fluorescent materials were measured by a spectrophotofluorometer: QE-2000 (manufactured by Otsuka Electronics Co., Ltd). Specifically, the wavelength of the excitation light was set to 450 nm, and the light emission spectra were measured. The relative emission intensities (%) and peak light emission wavelengths (nm) of the maximum peaks of the resultant respective light emission spectra were obtained. Here, the relative emission intensity was calculated using Fluorescent material C1 as a criterion. The peak light emission wavelengths were all around 538 nm.

The evaluation results are shown in Table 1 below.

TABLE 1

| | Temperature for fluorine-treatment (° C.) | Time for fluorine-treatment (h) | Liquid medium for washing treatment | Average particle diameter Dm (μm) | Relative emission intensity (%) |
|---|---|---|---|---|---|
| Example 1 | 25 | 8 | — | 14.2 | 151.4 |
| Example 2 | 50 | 8 | — | 12.9 | 182.6 |
| Example 3 | 100 | 8 | — | 11.4 | 225.3 |
| Example 4 | 150 | 8 | — | 11.4 | 223.4 |
| Example 5 | 300 | 8 | — | 9.6 | 234.1 |
| Example 6 | 500 | 8 | — | 10.1 | 206.3 |
| Example 7 | 150 | 8 | Pure water | 10.4 | 220.9 |
| Example 8 | 150 | 8 | Aqueous sodium hydroxide | 12.2 | 231.1 |
| Example 9 | 150 | 8 | Hydrochloric acid | 11.5 | 229.7 |
| Example 10 | 500 | 8 | Pure water | 10.4 | 205.8 |
| Example 11 | 150 | 5 | Hydrochloric acid | 11.3 | 246.5 |
| Example 12 | 150 | 0.5 | Hydrochloric acid | 11.4 | 244.8 |
| Comparative Example 1 | — | — | — | 14.5 | 100 |

Figure 1:
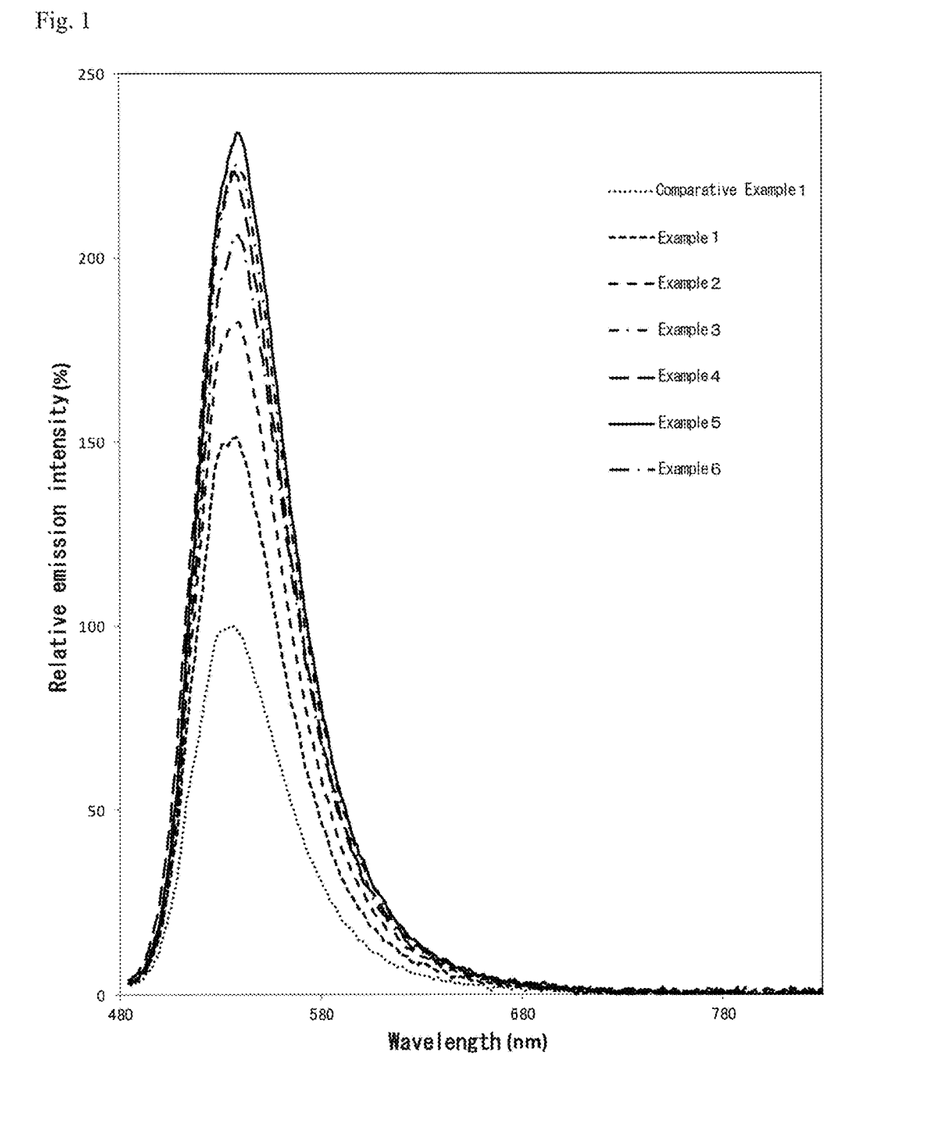
FIG. 1 is a graph showing a light emitting spectrum indicating relative emission intensity versus wavelength of a β-sialon fluorescent material according to the present embodiment.
Figure 2:
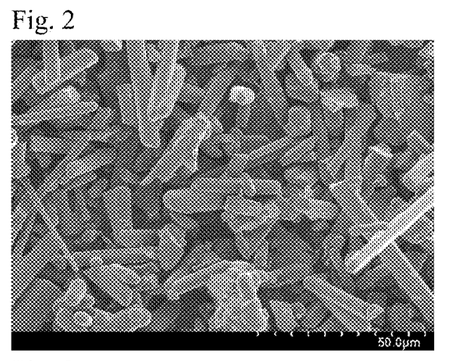
FIG. 2 is a view showing an example of a scanning electron microscope (SEM) image of a β-sialon fluorescent material according to Comparative Example 1.
Figure 3:
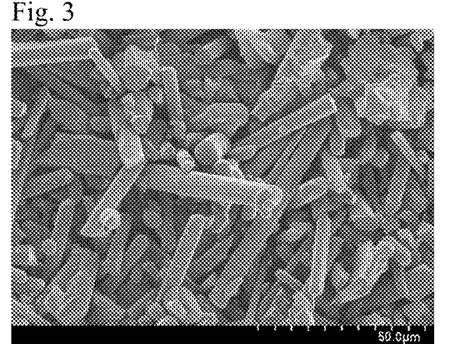
FIG. 3 is a view showing an example of an SEM image of a β-sialon fluorescent material according to Example 1.
Figure 4:
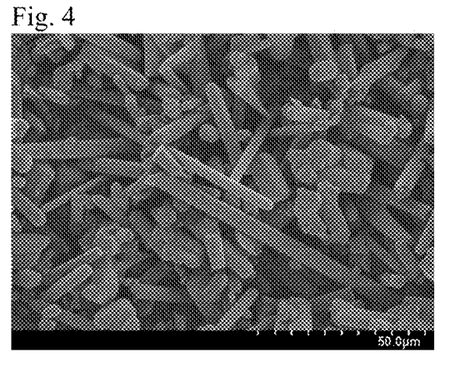
FIG. 4 is a view showing an example of an SEM image of a β-sialon fluorescent material according to Example 2.
Figure 5:
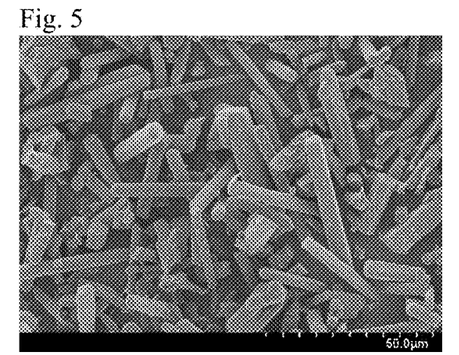
FIG. 5 is a view showing an example of an SEM image of a β-sialon fluorescent material according to Example 3.
Figure 6:
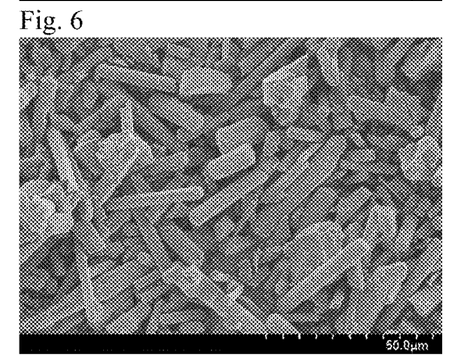
FIG. 6 is a view showing an example of an SEM image of a β-sialon fluorescent material according to Example 4.
Figure 7:
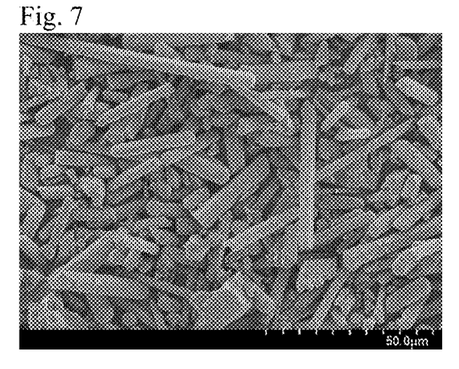
FIG. 7 is a view showing an example of an SEM image of a β-sialon fluorescent material according to Example 5.
Figure 8:
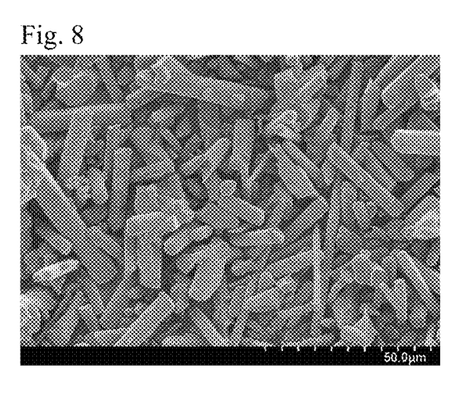
FIG. 8 is a view showing an example of an SEM image of a β-sialon fluorescent material according to Example 6.

Light-emitting spectra of β-sialon fluorescent materials obtained in Examples 1 to 6 and Comparative Example 1 were normalized to the maximum light emission intensity of Comparative Example 1, and are shown in FIG. 1. As shown in Table 1, Fluorescent materials 1 to 12 have high relative emission intensity and high luminance.

Scanning electron microscope (SEM) images showing the particle shapes of β-sialon fluorescent materials obtained in Examples 1 to 6, and Comparative Example 1 are respectively shown in FIGS. 2 to 8. FIGS. 2 to 8 indicate that the shapes of the β-sialon fluorescent materials are substantially the same and not changed. This is believed to indicate that no change in particle size occurs in the fluorine-treatment step. That is, it is believed that even when a β-sialon fluorescent material is treated with an elemental fluorine-containing gas, decomposed products or the like generated in the first heat treatment step were successfully removed without the shape of a β-sialon fluorescent material itself being impaired, resulting in high luminance.

The fluorescent materials of Examples 7, 8, and 9 (Fluorescent materials 7, 8, and 9) are the fluorescent material obtained in Example 4 (Fluorescent material 4) for which washing treatment was performed with the respective liquid mediums of different liquid properties, and all have light-emitting intensity greater or equivalent to the light-emitting intensity of Example 4, for which no washing treatment was performed. In particular, the fluorescent material obtained in Example 4 (Fluorescent material 4) that underwent washing treatment with an alkaline solution containing sodium hydroxide (Example 8: Fluorescent material 8) exhibited higher light-emitting intensity and was superior compared to the cases that underwent washing treatment with other liquids of different liquid properties. It is believed that adjusting the pH to alkaline improves the effect of removing unnecessary components compared to the cases treated with the other liquids.

As demonstrated in Examples 11 and 12, adjusting the time for the fluorine-treatment step clearly enhance relative emission intensity compared to Example 9.

Comparative Example 2

A synthesis was performed in the same conditions as those of Comparative Example 1 except that the first heat-treatment of the heat-treated product after the second heat treatment step was performed without a europium oxide, to obtain Fluorescent material C2.

Example 13

Fluorescent material 13 was obtained in the same manner as Comparative Example 2 except that fluorine-treatment was performed in the same manner as Example 4.

Example 14

Fluorescent material 14 was obtained in the same manner as Comparative Example 2 except that fluorine-treatment and washing treatment were performed in the same manner as Example 9.

The evaluation results obtained similarly to the previous evaluation method are shown in Table 2 below. The relative emission intensities are shown taking Fluorescent material C2 of Comparative Example 2 as a reference.

TABLE 2

| | Temperature for fluorine-treatment (° C.) | Time for fluorine-treatment (h) | Liquid medium for washing treatment | Average particle diameter Dm (μm) | Relative emission intensity (%) |
|---|---|---|---|---|---|
| Example 13 | 150 | 8 | — | 13.9 | 115.3 |
| Example 14 | 150 | 8 | Hydrochloric acid | 12.8 | 114.2 |
| Comparative Example 2 | — | — | — | 12.5 | 100 |

As shown in Table 2, Examples 13 and 14, which were subjected to fluorine-treatment, have a greater relative emission intensity compared to Comparative Example 2, which was not subjected to fluorine-treatment.

Example 15

Silicon nitride ($Si_3N_4$), aluminium nitride (AlN), aluminium oxide ($Al_2O_3$), and europium oxide ($Eu_2O_3$), which constitute a raw material compound, were weighed to satisfy the molar ratio of Si:Al:Eu=5.75:0.25:0.015, and O and N were charged to satisfy aluminium nitride:aluminium oxide=80:20 so as to adjust O and N to the defined value of z in the general formula (I), and mixed. The mixed raw material was burned at 2030° C. for 10 hours in a nitrogen atmosphere like Example 1 to obtain a β-sialon fluorescent material.

The heat-treated product resulting from this burning was ground, and the ground product was filled into a boron nitride crucible, and burned at 2030° C. for 10 hours at a pressure of about 0.92 MPa (gauge pressure) in a nitrogen atmosphere, and then the resultant product was subjected to a second heat treatment while the temperature was lowered to room temperature with a retention time of 5 hours at a temperature of 1500° C. to obtain a heat-treated product resulting from the second heat treatment step.

The second heat-treated product was subjected to fluorine-treatment in the same conditions as those of Example 4 to obtain Fluorescent material 15.

Example 16

Fluorescent material 16 was obtained in the same manner as Example 15 except that washing treatment like the one in Example 9 was performed after the fluorine-treatment step.

Comparative Example 3

A synthesis was performed in the same conditions as Example 15 except that no fluorine-treatment step was performed to obtain Fluorescent material C3.

The evaluation results obtained similarly to the previously described evaluation method are shown in Table 3 below. The peak light emission wavelengths of the fluorescent materials were all 541 nm.

TABLE 3

| | Temperature for fluorine-treatment (° C.) | Time for fluorine-treatment (h) | Liquid medium for washing treatment | Average particle diameter Dm (μm) | Relative emission intensity (%) |
|---|---|---|---|---|---|
| Example 15 | 150 | 8 | — | 17 | 164 |
| Example 16 | 150 | 8 | Hydrochloric acid | 17.5 | 170.1 |
| Comparative Example 3 | — | — | — | 17.5 | 100 |

Example 17

Fluorescent material 17 was obtained in the same manner as Example 15 except that no heat treatment of the heat-treated product resulting from the second heat treatment step and the europium oxide was performed.

Example 18

Fluorescent material 18 was obtained in the same manner as Example 17 except that washing treatment like the one in Example 9 was performed after the fluorine-treatment step.

Comparative Example 4

A synthesis was performed in the same conditions as those of Example 17 except that no fluorine-treatment step was performed, to obtain Fluorescent material C4.

The evaluation results obtained in the same manner as the previously described evaluation method are shown in Table 4 below. The peak light emission wavelengths of the fluorescent materials were all 541 nm.

TABLE 4

| | Temperature for fluorine-treatment (° C.) | Time for fluorine-treatment (h) | Liquid medium for washing treatment | Average particle diameter Dm (μm) | Relative emission intensity (%) |
|---|---|---|---|---|---|
| Example 17 | 150 | 8 | — | 18.2 | 104.8 |
| Example 18 | 150 | 8 | hydrochloric acid | 18.6 | 106 |
| Comparative Example 4 | — | — | — | 18.5 | 100 |

As demonstrated by Examples 15 to 18 shown in Tables 3 and 4, performing fluorine-treatment clearly lead to a greater relative emission intensity compared to Comparative Examples 3 and 4, which underwent no fluorine-treatment. It is also evident that Examples 15 and 16, which underwent heat treatment of the heat-treated product resulting from the second heat treatment step and europium oxide, have greater relative emission intensity compared to Examples 17 and 18, which underwent no similar heat treatment. Furthermore, Examples 16 and 18, which underwent washing treatment like Example 9, have slightly greater relative emission intensity compared to Examples 15 and 17, which underwent no washing treatment.

β-sialon fluorescent materials obtained according to the method of the present embodiment are greatly superior in light emission properties, and may be suitably used as a light source for lighting, LED displays, backlight sources, traffic signals, illuminated switches, various sensors and various indicators that incorporate, in particular, a blue light emitting diode or a UV light emitting diode as a light source.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing a β-sialon fluorescent material, comprising:
    providing a composition comprising a material represented by a formula: $Si_{6-z}Al_zO_zN_{8-z}$:Eu wherein z satisfies $0<z\leq4.2$;
    heat-treating the composition in a rare gas atmosphere or in a vacuum; and
    contacting the heat-treated composition with a fluorine-containing gas.

2. The method according to claim 1, wherein the fluorine containing gas comprises at least one selected from the group consisting of $F_2$, $CHF_3$, $CF_4$, $BrF_3$, $BrF_5$, $NH_4HF_2$, $NH_4F$, $SiF_4$, $SF_6$, $S_2F_{10}$, $ClF_3$, $KrF_2$, $XeF_2$, $XeF_4$, $PF_5$, $PF_3$, $BF_3$, and $NF_3$.

3. The method according to claim 1, wherein contacting the heat-treated composition with a fluorine-containing gas is performed in presence of an inert gas.

4. The method according to claim 1, wherein contacting the heat-treated composition with a fluorine-containing gas is performed at a temperature of above 50° C. to less than 500° C.

5. The method according to claim 1, wherein heat-treating the composition in a rare gas atmosphere or in a vacuum is performed in presence of a europium compound.

6. The method according to claim 1, wherein heat-treating the composition in a rare gas atmosphere or in a vacuum is performed at a temperature of from 1300° C. to 1600° C.

7. The method according to claim 1, wherein providing the composition comprises heat-treating a mixture comprising an aluminium compound, a europium compound, and silicon nitride to obtain the composition.

8. The method according to claim 1, wherein preparing the composition comprises heat-treating a mixture comprising an aluminium compound, a europium compound, and silicon nitride at a temperature of from 1850° C. to 2100° C. to obtain the composition.

9. The method according to claim 1, further comprising heat-treating the composition in a nitrogen atmosphere before heat-treating the composition in a rare gas atmosphere or in a vacuum.

* * * * *